United States Patent
Pasquale et al.

(10) Patent No.: US 11,836,375 B2
(45) Date of Patent: *Dec. 5, 2023

(54) STORAGE DEVICE HAVING A CONFIGURABLE COMMAND RESPONSE TRIGGER

(71) Applicant: Samsung Electronics Co., Ltd., Suwon-si (KR)

(72) Inventors: Chase Pasquale, San Jose, CA (US); Richard N. Deglin, Monterey, CA (US); Vishal Jain, Udaipur (IN); Jagannath Vishnuteja Desai, Bangalore (IN)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/544,589

(22) Filed: Dec. 7, 2021

(65) Prior Publication Data

US 2022/0091774 A1 Mar. 24, 2022

Related U.S. Application Data

(63) Continuation of application No. 16/834,584, filed on Mar. 30, 2020, now Pat. No. 11,194,503.

(Continued)

(51) Int. Cl.
*G06F 12/00* (2006.01)
*G06F 3/06* (2006.01)
*G06F 9/54* (2006.01)

(52) U.S. Cl.
CPC .......... *G06F 3/0653* (2013.01); *G06F 3/0604* (2013.01); *G06F 3/0647* (2013.01); *G06F 3/0673* (2013.01); *G06F 9/542* (2013.01)

(58) Field of Classification Search
CPC .... G06F 3/0653; G06F 3/0673; G06F 3/0647; G06F 9/542; G06F 3/0604
See application file for complete search history.

(56) References Cited

U.S. PATENT DOCUMENTS 6,574,696 B1 * 6/2003 Jerman ................. G06F 3/0682
710/1
9,513,820 B1 12/2016 Shalev
(Continued)

OTHER PUBLICATIONS

Sasmita: "Advantages and Disadvantages of Integrated Circuits (ICs)," Electronics Post, Nov. 10, 2015, 5 pages, Retrieved from the Internet: URL: https://electronicspost.com/advantages-and-disadvantages-of-integrated-circuits-ics/.

*Primary Examiner* — John A Lane
(74) *Attorney, Agent, or Firm* — Lewis Roca Rothgerber Christie LLP (57) ABSTRACT

A storage device includes: a storage controller to receive one or more notifications corresponding to host data transferred from a host device to the storage device over a storage interface; and a response circuit connected to the storage controller, the response circuit to trigger a response to the host device, and including: a first counter to track the one or more notifications, the one or more notifications corresponding to an entirety of the host data such that each of the notifications corresponds to a portion of the host data; a second counter to track one or more acknowledgements received from the storage controller, the one or more acknowledgments corresponding to the one or more notifications such that each of the acknowledgments corresponds to a notification; and a response trigger to select one of the first counter and the second counter to trigger the response to the host device.

20 Claims, 4 Drawing Sheets

Related U.S. Application Data

(60) Provisional application No. 62/988,214, filed on Mar. 11, 2020.

(56) References Cited

U.S. PATENT DOCUMENTS

| | | | |
|---|---|---|---|
| 10,007,638 B2 * | 6/2018 | Nelogal | G06F 13/4282 |
| 10,572,180 B1 * | 2/2020 | Nemawarkar | G06F 3/0659 |
| 11,119,691 B1 * | 9/2021 | Nemawarkar | G06F 3/0679 |
| 2005/0125802 A1 | 6/2005 | Wang et al. | |
| 2009/0094401 A1 | 4/2009 | Larson et al. | |
| 2010/0332909 A1 | 12/2010 | Larson | |
| 2013/0007533 A1 * | 1/2013 | Miller | G06F 11/3466 |
| | | | 714/45 |
| 2013/0263155 A1 | 10/2013 | Wuerz | |
| 2014/0365707 A1 | 12/2014 | Talagala et al. | |
| 2015/0248334 A1 | 9/2015 | Lucas et al. | |
| 2016/0269507 A1 * | 9/2016 | Kumar | H04L 47/283 |
| 2016/0292021 A1 | 10/2016 | Williams | |
| 2017/0212711 A1 | 7/2017 | Inoue | |
| 2018/0012627 A1 | 1/2018 | Burkhardt et al. | |
| 2019/0018597 A1 | 1/2019 | Zhang et al. | |
| 2019/0171392 A1 | 6/2019 | Kim et al. | |
| 2019/0196975 A1 * | 6/2019 | Inbar | G06F 12/0246 |
| 2020/0133865 A1 | 4/2020 | Mannava et al. | |

\* cited by examiner

STORAGE DEVICE HAVING A CONFIGURABLE COMMAND RESPONSE TRIGGER

CROSS-REFERENCE TO RELATED APPLICATION(S)

This application is a continuation of U.S. patent application Ser. No. 16/834,584, filed Mar. 30, 2020, which claims priority to and the benefit of U.S. Provisional Application No. 62/988,214, filed on Mar. 11, 2020, entitled "STORAGE DEVICE HAVING CONFIGURABLE COMMAND RESPONSE TRIGGER," the entire contents of both of which are incorporated herein by reference.

FIELD

Aspects of one or more example embodiments of the present disclosure relate to storage devices, and more particularly, to a storage device having a configurable command response trigger, and a method including the same.

BACKGROUND

A storage system generally includes a host device and one or more storage devices. The host device may store data in the storage device by transmitting commands to the storage device. For example, the host device may transmit a WRITE command to the storage device to store host data corresponding to the WRITE command in the storage device. In this case, the WRITE command may include several phases, for example, such as a command issue phase, a data transfer phase, and a response phase. During the command issue phase, the host device may issue the WRITE command to the storage device, and the host device may transfer the host data to the storage device during the data transfer phase. Once all of the host data has been written by the storage device, the storage device may transmit a response to the host device during the response phase, indicating that the WRITE command was successfully completed.

The above information disclosed in this Background section is for enhancement of understanding of the background of the present disclosure, and therefore, it may contain information that does not constitute prior art.

SUMMARY

One or more example embodiments of the present disclosure are directed to a storage device including a hardware module (e.g., a response circuit) having a configurable command response trigger. The hardware module may track various state information of the host data as the host data is transferred to the storage device, and may automatically transmit a suitable response to the host device according to the state information of the host data, rather than using firmware or software (e.g., a processor executing instructions) to maintain the state information and to initiate transmission of the response. Accordingly, latency may be reduced and/or throughput of the storage device may be improved.

According to one or more example embodiments of the present disclosure, a storage device includes: a storage controller configured to receive one or more notifications corresponding to host data transferred from a host device to the storage device over a storage interface; storage memory; and a response circuit connected to the storage controller, the response circuit configured to trigger a response to the host device, and including: a first counter configured to track the one or more notifications, the one or more notifications corresponding to an entirety of the host data such that each of the notifications corresponds to a portion of the host data from among the entirety of the host data; a second counter configured to track one or more acknowledgements received from the storage controller, the one or more acknowledgments corresponding to the one or more notifications such that each of the acknowledgments corresponds to a notification from among the one or more notifications; and a response trigger configured to select one from among the first counter and the second counter to trigger the response to the host device. The response circuit is configured to transmit the response to the host device according to a state of the selected one from among the first counter and the second counter.

In an example embodiment, the state may correspond to a count value of the selected one from among the first counter and the second counter.

In an example embodiment, the count value may be initialized based on a command transfer length associated with the host data.

In an example embodiment, the first counter may be the selected one from among the first counter and the second counter, and the count value of the first counter may be decremented for each notification from among the one or more notifications that is transmitted to the storage controller.

In an example embodiment, the response trigger may include a comparator, and the comparator may be configured to compare the count value with a threshold value.

In an example embodiment, the response circuit may be configured to determine that the host data has been received and notified in response to the count value being equal to the threshold value.

In an example embodiment, the second counter may be the selected one from among the first counter and the second counter, and the count value of the second counter may be decremented for each acknowledgement from among the one or more acknowledgements that is received from the storage controller.

In an example embodiment, the storage controller may be configured to transmit an acknowledgment from among the one or more acknowledgments in response to processing a corresponding notification.

In an example embodiment, the response trigger may include a comparator, and the comparator may be configured to compare the count value with a threshold value; and the response circuit may be configured to determine that the host data has been processed by the storage device in response to the count value being equal to the threshold value.

In an example embodiment, the storage controller may be configured to persistently store the host data in the storage memory based at least in part on the notifications.

According to one or more example embodiments of the present disclosure, a method of triggering a response to a command issued by a host device to a storage device, includes: receiving, by a storage controller, one or more notifications corresponding to host data transferred over the storage interface from the host device to the storage device, the host data corresponding to the command; triggering, by a response circuit connected to the storage controller, a response to the host device, wherein the triggering includes: tracking, by a first counter of the response circuit, the one or more notifications, the one or more notifications corresponding to an entirety of the host data such that each of the notifications corresponds to a portion of the host data from among the entirety of the host data; receiving, by the response circuit, one or more acknowledgments from the storage controller, the one or more acknowledgments corresponding to the one or more notifications such that each of the acknowledgments corresponds to a notification from among the one or more notifications; tracking, by a second counter of the response circuit, the plurality of acknowledgments; and selecting, by a response trigger of the response circuit, one from among the first counter and the second counter to trigger the response; and transmitting, by the response circuit, the response to the host device according to a state of the selected one from among the first counter and the second counter.

In an example embodiment, the state may correspond to a count value of the selected one from among the first counter and the second counter.

In an example embodiment, the method may further include: initiating, by the response circuit, the count value based on a command transfer length associated with the host data.

In an example embodiment, the first counter may be the selected one from among the first counter and the second counter, and the method may further include: decrementing, by the response circuit, the count value of the first counter for each notification from among the one or more notifications that is transmitted to the storage controller.

In an example embodiment, the response trigger may include a comparator, and the method may further include: comparing, by the comparator, the count value with a threshold value.

In an example embodiment, the method may further include: determining, by the response circuit, that the host data has been received and notified in response to the count value being equal to the threshold value.

In an example embodiment, the second counter may be the selected one from among the first counter and the second counter, and the method may further include: decrementing, by the response circuit, the count value of the second counter for each acknowledgement from among the one or more acknowledgements that is received from the storage controller.

In an example embodiment, the method may further include: processing, by the storage controller, a corresponding notification from among the one or more notifications; and transmitting, by the storage controller, an acknowledgment from among the one or more acknowledgements in response to the processing of the corresponding notification.

In an example embodiment, the response trigger may include a comparator, and the method may further include: comparing, by the comparator, the count value with a threshold value; and determining, by the response circuit, that the host data has been processed by the storage device in response to the count value being equal to the threshold value.

In an example embodiment, the method may further include: persistently storing, by the storage controller, the host data in storage memory based at least in part on the notifications.

BRIEF DESCRIPTION OF THE DRAWINGS

The above and other aspects and features of the present disclosure will become more apparent to those skilled in the art from the following detailed description of the example embodiments with reference to the accompanying drawings.

DETAILED DESCRIPTION

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated.

Generally, the command issue phase, the data transfer phase, and the response phase are completed in-order according to a storage interface (e.g., an interface bus), such that a processor (e.g., a storage controller, a general purpose processor, and/or the like) using instructions (e.g., firmware, software, and/or the like) executing thereon maintains state information of the host data during the data transfer phase to determine when all of the host data has been received and stored. Once the processor determines that all of the host data has been received and stored, the processor may initiate transmission of a response back to the host device, indicating that the command was successfully executed. In this case, however, maintaining state information and initiating responses by the processor may introduce latency and/or may reduce throughput (e.g., overall throughput) of the storage device.

According to one or more example embodiments of the present disclosure, a storage device may include a hardware module (e.g., a response circuit) to track state information of the host data as the host data is transferred to the storage device, rather than using firmware or software (e.g., a processor executing instructions, such as a storage controller) to maintain and process the state information of the host data. In some embodiments, the hardware module may include a configurable command response trigger to provide a suitable response to the host device according to various different states of the host data being transferred to the storage device and a configuration of the command response trigger. Accordingly, latency (e.g., a processing time) may be reduced, and/or throughput of the storage device may be improved.

In some embodiments, the command response trigger may be dynamically configured according to various characteristics of the storage device 104 and/or the host data, for example, such as an implementation, an application, a data type, acceptability of data loss, an operational health, user requirements (e.g., such as a Service Level Agreement (SLA)), and/or the like. Accordingly, in some embodiments, the command response trigger of the hardware module may be dynamically configured at start-time, runtime, on a per-command basis, and/or the like, in consideration of the various characteristics of the storage device and/or the host data, and according to a balance between a desired or suitable performance and a desired or suitable reliability of the storage device. These and other aspects and features of the present disclosure will be described in more detail below with reference to the figures.

Figure 1:
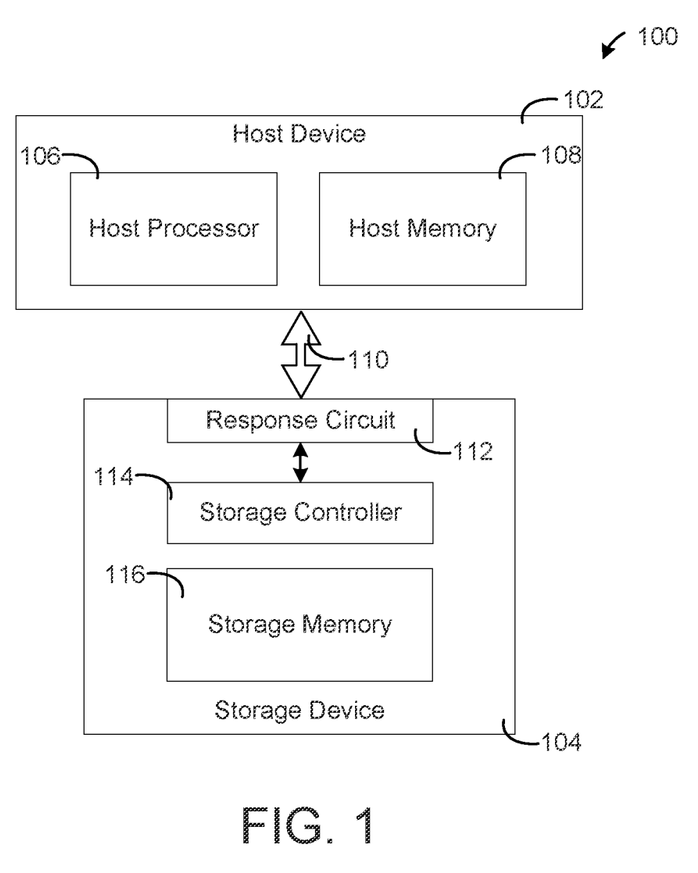
FIG. 1 is a system diagram of a storage system, according to one or more example embodiments of the present disclosure.

FIG. 1 is a system diagram of a storage system, according to one or more example embodiments of the present disclosure.

In brief overview, the storage system 100 according to one or more embodiments of the present disclosure may include a host device (e.g., a host computer) 102 and a storage device 104. The host device 102 may issue commands to the storage device 104, such that the storage device 104 stores host data associated with the commands therein. For example, the host device 102 may be communicably connected to the storage device 104 (e.g., over a storage interface 110), and may issue a WRITE command to the storage device 104, such that host data corresponding to the WRITE command is transferred and stored in (e.g., is written to) the storage device 104. Once all of the host data has been successfully received and/or stored, the storage device 104 may transmit an appropriate response to the host device 102, indicating that the command was successfully executed.

In one or more example embodiments, the storage device 104 may include a hardware module (e.g., a response circuit 112) to track state information of the host data as the host data is transferred to the storage device 104, rather than using firmware or software (e.g., a processor executing instructions, such as a storage controller 114) to maintain and process the state information of the host data. For example, rather than waiting for the firmware or software to maintain and process the state information corresponding to the host data transfer in order to determine when to initiate transmission of a response back to the host device, the hardware module (e.g., the response circuit 112) may automatically transmit a suitable response back to the host device according to the state information of the host data being transferred. Accordingly, latency (e.g., a processing time) may be reduced, and/or throughput of the storage device 104 may be improved.

In one or more example embodiments, the hardware module (e.g., the response circuit 112) may include a configurable command response trigger to provide a suitable response to the host device 102 according to various different states of the host data being transferred to the storage device 104 and a configuration of the command response trigger. For example, an earlier response (e.g., when in a state where all of the host data has been received, but before the host data is actually stored in persistent memory) may increase performance (e.g., may increase speed), but may also decrease reliability (e.g., may increase the risk of data loss), whereas a later response (e.g., when in a state after all of the host data has been stored in the persistent memory) may decrease the risk of data loss, but may also increase latency. Accordingly, in some embodiments, the command response trigger may be configured according to a balance between performance and reliability of the storage device 104.

In one or more example embodiments, the command response trigger may be dynamically configured according to various characteristics of the storage device 104 and/or the host data, for example, such as an implementation, an application, a data type, acceptability of data loss, an operational health, user requirements (e.g., such as a Service Level Agreement (SLA)), and/or the like. For example, in some embodiments, the internal timing of the storage device for each of the phases may vary depending on an implementation and/or an application of the storage device 104. As an illustrative example, for a storage device that implements a volatile writeback cache, the hardware module (e.g., the response circuit 112) may be configured to transmit a response to the host device after the host data is placed (e.g., is temporarily stored) in a volatile data cache, whereas for a storage device that does not implement the volatile writeback cache, the hardware module (e.g., the response circuit 112) may first ensure that the host data is stored in non-volatile memory before transmitting a response to the host device 102. In the former case, the command response trigger may be configured such that the hardware module (e.g., the response circuit 112) provides the response to the host device 102 earlier than in the latter case, but risk of data loss may be increased when compared to the latter case. Accordingly, in some embodiments, the command response trigger of the hardware module (e.g., the response circuit 112) may be dynamically configured at start-time, runtime, on a per-command basis, and/or the like, in consideration of the various characteristics of the storage device 104 and/or the host data, and according to a balance between a desired or suitable performance and a desired or suitable reliability of the storage device 104.

In more detail, referring to FIG. 1, the host device 102 may include the host processor 106 and the host memory 108. The host processor 106 may be a general purpose processor, for example, such as a central processing unit (CPU) core of the host device 102. The host memory 108 may be considered as high performing main memory (e.g., primary memory) of the host device 102. For example, in some embodiments, the host memory 108 may include (or may be) volatile memory, for example, such as dynamic random-access memory (DRAM). However, the present disclosure is not limited thereto, and the host memory 108 may include (or may be) any suitable high performing main memory (e.g., primary memory) replacement for the host device 102 as would be known to those skilled in the art. For example, in other embodiments, the host memory 108 may be relatively high performing non-volatile memory, such as NAND flash memory, Phase Change Memory (PCM), Resistive RAM, Spin-transfer Torque RAM (STTRAM), any suitable memory based on PCM technology, memristor technology, and/or resistive random access memory (Re-RAM) and can include, for example, chalcogenides, and/or the like.

The storage device 104 may be considered as secondary memory that may persistently store data accessible by the host device 102. In this context, the storage device 104 may include (or may be) relatively slower memory when compared to the high performing memory of the host memory 108. For example, in some embodiments, the storage device 104 may be secondary memory of the host device 102, for example, such as a Solid-State Drive (SSD). However, the present disclosure is not limited thereto, and in other embodiments, the storage device 104 may include (or may be) any suitable storage device, for example, such as a magnetic storage device (e.g., a hard disk drive (HDD), and the like), an optical storage device (e.g., a Blue-ray disc drive, a compact disc (CD) drive, a digital versatile disc (DVD) drive, and the like), other kinds of flash memory devices (e.g., a USB flash drive, and the like), and/or the like. In various embodiments, the storage device 104 may conform to a large form factor standard (e.g., a 3.5 inch hard drive form-factor), a small form factor standard (e.g., a 2.5 inch hard drive form-factor), an M.2 form factor, an E1.S form factor, and/or the like. In other embodiments, the storage device 104 may conform to any suitable or desired derivative of these form factors. For convenience, the storage device 104 may be described hereinafter in the context of an SSD, but the present disclosure is not limited thereto.

The storage device 104 may be communicably connected to the host device 102 over a storage interface 110. The storage interface 110 may facilitate communications (e.g., using a connector and a protocol) between the host device 102 and the storage device 104. In some embodiments, the storage interface 110 may facilitate the exchange of storage requests and responses between the host device 102 and the storage device 104. In some embodiments, the storage interface 110 may facilitate data transfers by the storage device 104 to and from the host memory 108 of the host device 102. For example, in an embodiment, the storage interface 110 (e.g., the connector and the protocol thereof) may include (or may conform to) Small Computer System Interface (SCSI), Non Volatile Memory Express (NVMe), and/or the like. In this case, a WRITE command by the host device 102 over the storage interface 110 may include a command issue phase, a data transfer phase, and a response phase. However, the present disclosure is not limited thereto, and in other embodiments, the storage interface 110 (e.g., the connector and protocol thereof) may conform to other suitable storage interfaces, for example, such as Peripheral Component Interconnect Express (PCIe), remote direct memory access (RDMA) over Ethernet, Serial Advanced Technology Attachment (SATA), Fiber Channel, Serial Attached SCSI (SAS), NVMe over Fabric (NVMe-oF), and/or the like. In other embodiments, the storage interface 110 (e.g., the connector and the protocol thereof) may include (or may conform to) various general-purpose interfaces, for example, such as Ethernet, Universal Serial Bus (USB), and/or the like. For convenience, the storage interface 110 may be described hereinafter in the context of a SCSI interface, but the present disclosure is not limited thereto.

In some embodiments, the storage device 104 may include a storage controller 114, and storage memory 116. The storage controller 114 may be connected to the storage interface 110 (e.g., via a response circuit 112), and may respond to input/output (I/O) requests received from the host device 102 over the storage interface 110. The storage controller 114 may provide an interface to control, and to provide access to and from, the storage memory 116. For example, the storage controller 114 may include at least one processing circuit embedded thereon for interfacing with the host device 102 and the storage memory 116. The processing circuit may include, for example, a digital circuit (e.g., a microcontroller, a microprocessor, a digital signal processor, or a logic device (e.g., a field programmable gate array (FPGA), an application-specific integrated circuit (ASIC), and/or the like)) capable of executing data access instructions (e.g., via firmware and/or software) to provide access to and from the data stored in the storage memory 116 according to the data access instructions. For example, the data access instructions may include any suitable data storage and retrieval algorithm (e.g., READ/WRITE) instructions, and/or the like. The storage memory 116 may persistently store the data received from the host device 102. In an embodiment, the storage memory 116 may include non-volatile memory, for example, such as NAND flash memory. However, the present disclosure is not limited thereto, and the storage memory 116 may include any suitable memory depending on a type of the storage device 104 (e.g., magnetic disks, tape, optical disks, and/or the like).

In one or more example embodiments, the storage device 104 may further include a response circuit 112. The response circuit 112 may be implemented as a hardware module (e.g., an electronic circuit) that is communicably connected between the storage interface 110 and the storage controller 114. For example, in an embodiment, the response circuit 112 may be implemented as an integrated circuit (IC) that is attached to (or mounted on) the storage device 104 (e.g., that may be embedded on the same board or the same circuit board as that of the storage device 104). For example, the response circuit 112 may be implemented on (e.g., may be attached to or mounted on) the storage device 104 as a system on chip (SOC). However, the present disclosure is not limited thereto, for example, in another embodiment, the response circuit 112 may be implemented on a separate circuit board (e.g., a printed circuit board PCB) from that of the storage device 104, and may be connected between the storage interface 110 and the storage device 104.

In one or more example embodiments, as the host data is being transferred from the host device 102 to the storage device 104 over the storage interface 110, the response circuit 112 may receive the host data and may track state information corresponding to one or more states of the transferred host data. The response circuit 112 may include a configurable command response trigger, such that a suitable response may automatically transmitted back to the host device 102 according to the one or more states of the transferred host data and a configuration (e.g., a mode) of the configurable command response trigger. Accordingly, rather than having a processor (e.g., the storage controller 114) executing firmware and/or software track the one or more states to initiate a response back to the host device 102, the response circuit 112 may track the one or more states to automatically generate and transmit a suitable response to the host device 102 according to the one or more states. Thus, latency may be reduced, and/or throughput of the storage device may be improved. The response circuit 112 will now be described in more detail hereinafter with reference to FIGS. 2-4.

Figure 2:
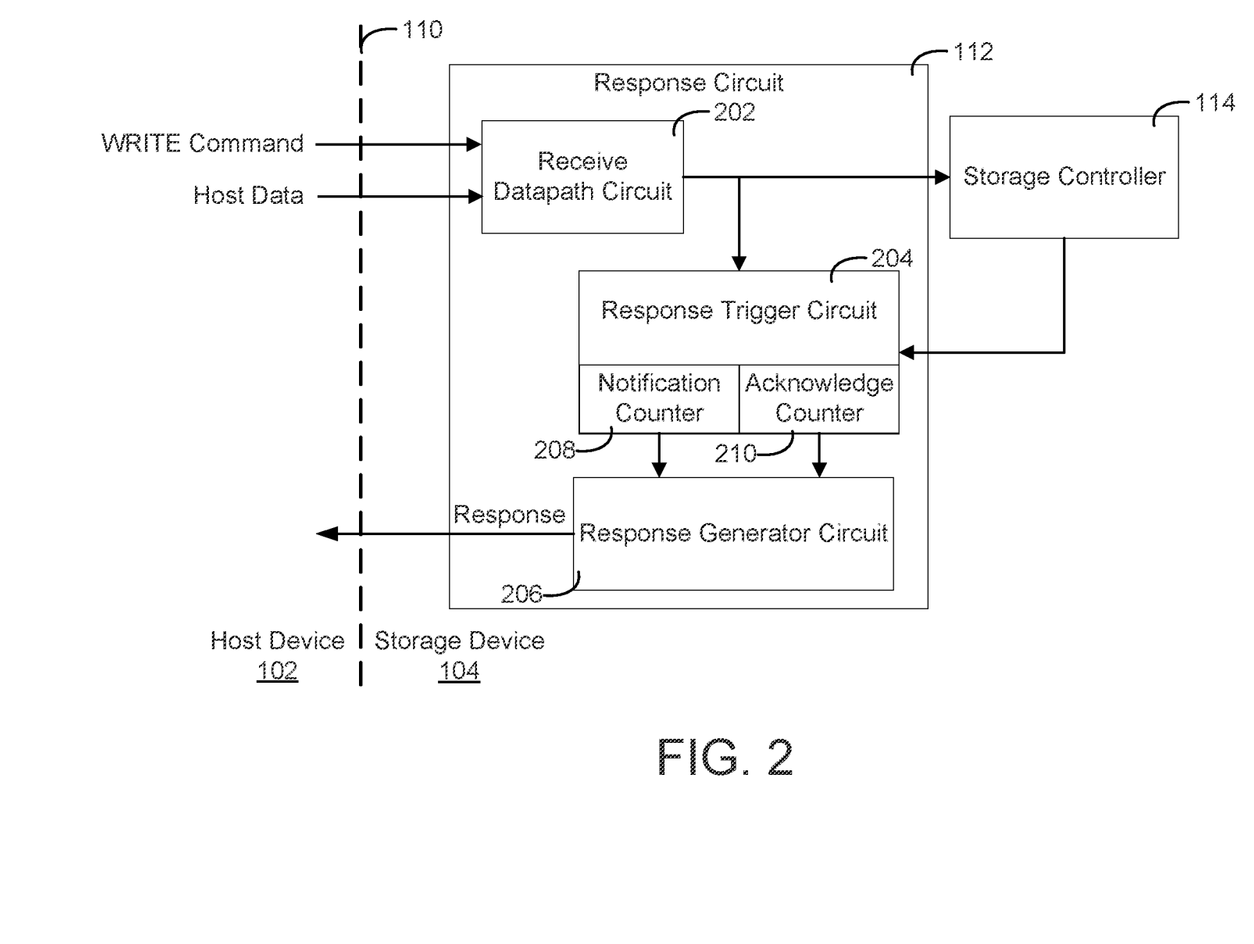
FIG. 2 is a block diagram of a response circuit of a storage device, according to one or more example embodiments of the present disclosure.

FIG. 2 is a block diagram of the response circuit 112, according to one or more example embodiments of the present disclosure.

In brief overview, the response circuit 112 may be a hardware module (e.g., an electronic circuit) that is connected between the storage interface 110 and the storage controller 114. The response circuit 112 may include a datapath (e.g., a receive datapath circuit 202) to receive the host data as the host data is being transferred from the host device 102 to the storage device 104 over the storage interface 110. The response circuit 112 may track the state information of the host data (e.g., using one or more counters 208 and 210) while the host data is being transferred from the host device 102 over the storage interface 110, and may provide an appropriate response to the host device 102 according to the state information of the host data.

For example, in an embodiment, when a portion (e.g., a block) of the transferred host data is received at the datapath (e.g., the receive datapath circuit 202), the response circuit 112 may transmit a notification to the storage controller 114

(or another processor executing firmware or software) corresponding to the received portion of the host data, to inform the storage controller 114 that the portion of the host data has been received. The storage controller 114 may process the notification to persistently store the host data in the storage memory 116, and may transmit an acknowledgment back to the response circuit 112, indicating that the notification has been processed. In this case, the response circuit 112 may track (e.g., via a notification counter 208) that the notification was transmitted to the storage controller 114, and may track (e.g., via an acknowledgement counter 210) that an acknowledgement corresponding to the notification was received from the storage controller, indicating that the notification was processed by the storage controller 114.

In some embodiments, depending on a configuration (e.g., a mode) of the response circuit 112 (e.g., a configuration of a configurable command response trigger), the response circuit 112 may automatically transmit a response to the host device 102 according to the notifications and/or the acknowledgments, indicating that the command was successfully executed. For example, the response circuit 112 may be configured to automatically transmit the response to the host device 102 once all of the host data has been received and notified, but not necessarily processed by the storage controller 114, and/or may be configured to automatically transmit the response to the host device 102 after all of the acknowledgements corresponding to the notifications have been received from the storage device 104, which indicates that all of the notifications have been processed by the storage device 104. In the former case, the notifications may be transmitted to the host device 102 earlier than in the latter case, but risk of data loss may be increased when compared to the latter case.

In more detail, referring to FIG. 2, according to one or more example embodiments of the present disclosure, the response circuit 112 may include a receive datapath circuit 202, a response trigger circuit 204, and a response generator circuit 206. In some embodiments, the receive datapath circuit 202 may receive portions of the host data as the host data is being transferred from the host device 102 to the storage device 104 over the storage interface 110. For example, a command transfer length may indicate that the host data for a corresponding WRITE command includes, for example, a plurality of blocks of data, such that a portion of the host data may correspond to a block of data from among the plurality of blocks of data. In this case, when a portion (e.g., a block) of the host data is received, the receive datapath circuit 202 may transmit a notification to the storage controller 114 (or another processor executing firmware and/or software) to inform the storage controller 114 that the portion of the host data has been received. The storage controller 114 may process the notification, and may transmit an acknowledgment to the response trigger circuit 204, indicating that the notification has been processed.

In some embodiments, the notifications may include information to identify the portions of the host data, and locations (e.g., temporary locations) where the portions of the host data are placed (e.g., are temporarily stored), such that the storage controller 114 may process the notifications to persistently store the host data in the storage memory 116 according to the notifications. For example, in some embodiments, the received datapath circuit 202 may be connected to (or may include) a cache (e.g., a volatile data cache) to temporarily store the portions of the host data as the portions are received over the storage interface 110, until the storage controller 114 processes the notifications and/or persistently stores the host data in the storage memory 116. In this case, in an embodiment, while the storage controller 114 may generally transmit a corresponding acknowledgement as each of the notifications is processed and the corresponding portion of the host data is persistently stored in the storage memory 116, the present disclosure is not limited thereto. For example, the corresponding acknowledgment for each portion of the host data may be transmitted before, after, or during the storing of the portion of the host data in the storage memory 116, as long as the persistent storing of the host data in the storage memory 116 is relatively ensured.

While the receive datapath circuit 202 is shown in FIG. 2 as being a part of the response circuit 112, the present disclosure is not limited thereto. For example, in another embodiment, the datapath circuit 202 may be implemented separately from the response circuit 112, and may transmit the notifications to the storage controller 114 (or another processor executing firmware and/or software) to process the notifications. In this case, the datapath circuit 202 may further transmit the notification (or a signal indicating the transmission of the notification) to the response circuit 112, such that the response circuit 112 may track a notification state of the host data. For example, in various embodiments, the receive datapatch circuit 202 may be implemented on the same board (e.g., the same circuit board) as that of the storage device 104, may be a separate module (e.g., a separate hardware module or a separate processor executing instructions) that is communicably connected to the storage interface 110 and the storage device 104, may be implemented as part of the storage controller 114, and/or the like.

In some embodiments, the response trigger circuit 204 may include one or more counters to track the state information of the host data to determine, for example, whether the transferred host data is in a suitable state to trigger an automatic response back to the host device 102. For example, the one or more counters may track a notification state of the host data, for example, such as whether the storage controller 114 has been notified that all of the host data has been received, and/or may track an acknowledgement state of the host data, for example, such as whether all of the notifications have been processed and acknowledged by the storage controller 114. In this case, the response generator circuit 206 may automatically transmit a suitable response to the host device 102 according to (e.g., depending on) the state information of the host data (e.g., according to a state of the one or more counters).

For example, in some embodiments, the one or more counters may include a notification counter 208 and an acknowledgement counter 210. In some embodiments, the notification counter 208 and the acknowledgement counter 210 may be initialized according to a size of the host data. As an illustrative example, if the command transfer length indicates that the host data includes 5 blocks, each of the notification counter 208 and the acknowledgement counter 210 may be initialized to have an initial value of 5. In this example, as the receive datapath circuit 202 transmits a notification to the storage controller 114 for each block of host data that is received at the receive datapath circuit 202, the notification counter 208 may be decremented. Similarly, in this example, as the storage controller 114 acknowledges each of the notifications for each of the 5 blocks of host data, the acknowledgment counter 210 may be decremented. Accordingly, when all of the host data has been received and notified to the storage controller 114, the notification counter 208 may have a value of 0, and when all of the notifications have been processed and acknowledged by the storage controller 114, the acknowledgment counter 210 may have a value of 0.

In some embodiments, the response generator circuit 206 may automatically transmit a suitable response to the host device 102 according to the state of the notification counter 208 and/or the state of the acknowledgment counter 210. For example, in some embodiments, the response generator circuit 206 may be connected to the notification counter 208 and/or the acknowledgment counter 210, and may determine when one or both of the notification counter 208 and/or the acknowledgment counter 210 has the value of 0. In this case, the response generator circuit 206 may automatically transmit a suitable response to the host device 102 when the value of the notification counter 208 is decremented to 0 and/or when the value of the acknowledgment counter 210 is decremented to 0. For example, when the value of the notification counter 208 is decremented to 0, the response generator circuit 206 may transmit the response to the host device 102 earlier, but risk of data loss may be increased, because the storage controller 114 may not have processed all of the notifications. On the other hand, when the value of the acknowledgment counter 210 is decremented to 0, the risk of data loss may be decreased, but the response to the host device 102 may be transmitted later, because the response generator circuit 206 first waits until all of the notifications have been processed and acknowledged by the storage controller 114 before transmitting the response to the host device 102.

Accordingly, in some embodiments, the response circuit 112 may have a configurable command response trigger, such that the response generator circuit 206 transmits the response to the host device 102 according to a configuration (e.g., a mode) of the command response trigger. For example, as discussed in more detail below with reference to FIG. 3, in some embodiments, the configurable command response trigger may be implemented as a part of the response trigger circuit 204. In other embodiments, the configurable command response trigger may include the counters of the response trigger circuit 204, and may be implemented as part of the response generator circuit 206.

Figure 3:
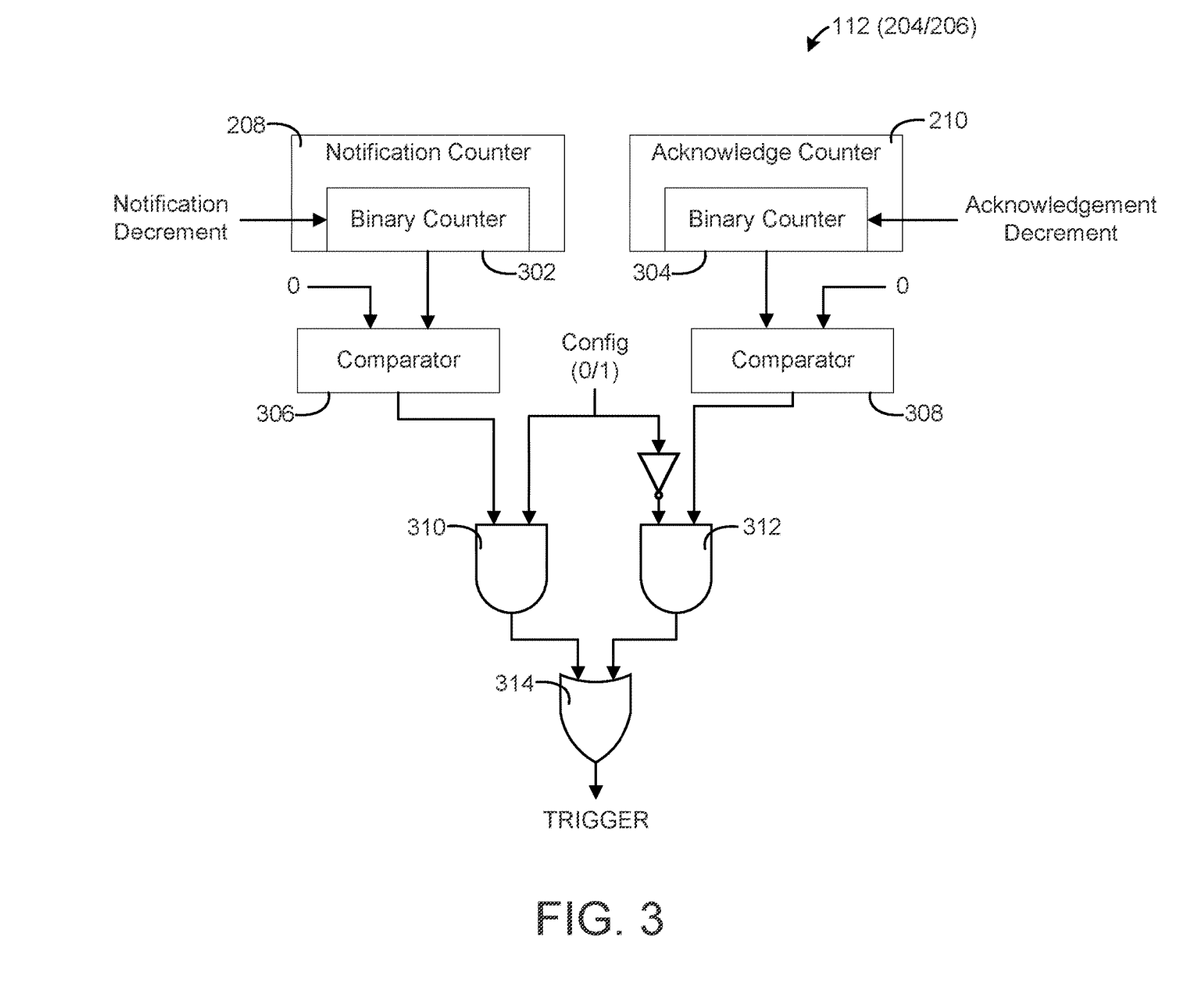
FIG. 3 is a schematic circuit diagram illustrating a configurable command response trigger of a response circuit, according to one or more example embodiments of the present disclosure.

FIG. 3 is a schematic circuit diagram illustrating a configurable command response trigger of a response circuit, according to one or more example embodiments of the present disclosure. FIG. 3 illustrates a portion of the response circuit 112 corresponding to the configurable command response trigger, for example, a portion including the notification counter 208 and the acknowledgement counter 210 of the response trigger circuit 204, and/or a portion of the response generator circuit 206.

Referring to FIG. 3, in some embodiments, the response circuit 112 may include the configurable command response trigger, such that the response may be automatically transmitted to the host device 102 according a state of the notification counter 208 and/or the acknowledgement counter 210 and a configuration (e.g., a mode) of the configurable command response trigger. For example, each of the notification counter 208 and the acknowledgement counter 210 may include (e.g., may be implemented as) a binary counter 302 and 304. The binary counter 302 and 304 of each of the notification counter 208 and the acknowledgement counter 210 may be initialized according to a size of the host data, for example, according to (e.g., based on) the command transfer length associated with the host data. As the notifications are transmitted to the storage controller 114 (e.g., from the receive datapath circuit 202), the binary counter 302 of the notification counter 208 may be decremented. As acknowledgements are received (e.g., by the response trigger circuit 204) from the storage controller 114, the binary counter 304 of the acknowledgement counter 210 may be decremented.

In some embodiments, each of the binary counters 302 and 304 may provide a current value thereof to a corresponding comparator 306 and 308. Each of the comparators 306 and 308 may determine whether a corresponding binary counter 302 and 304 has reached a threshold (e.g., has been decremented to 0). For example, in some embodiments, each of the comparators 306 and 308 may compare the current value of the corresponding binary counter 302 and 304 with a threshold value (e.g., 0), in order to determine whether the corresponding binary counter 302 and 304 has reached the threshold (e.g., has been decremented to 0). In some embodiments, each of the comparators 306 and 308 may output a comparison result according to (e.g., based on) the comparison. For example, in some embodiments, if the corresponding binary counter 302 and 304 has reached the threshold value (e.g., 0), the corresponding comparator 306 and 308 may output a high-level signal (e.g., 1) as the comparison result. On the other hand, if the corresponding binary counter 302 and 304 has a value other than the threshold value, for example, a value greater than 0, the corresponding comparator 306 and 308 may output a low-level signal (e.g., 0) as the comparison result.

In some embodiments, each of the comparators 306 and 308 may provide the comparison result to a corresponding first logic gate (e.g., to a corresponding AND logic gate) 310 and 312. In an embodiment, the first logic gates 310 and 312 may be used to select one of the notification counter 208 and the acknowledgement counter 210 as the trigger for automatically transmitting the response (e.g., via the response generator circuit 206) to the host device 102. For example, each of the first logic gates 310 and 312 may receive a configuration signal (Config), such that one of the first logic gates 310 and 312 may be selected at a time according to the Config signal. In this case, the Config signal may be provided at start-time, runtime, on a per-command basis, and/or the like, in consideration of the various characteristics of the storage device 104 and/or the host data, and according to a balance between performance and a desired reliability of the storage device 104, such that a suitable or desired one of the first logic gates 310 and 312, and thus, a suitable or desired one of the notification counter 208 and the acknowledgement counter 210, is selected at a time. For example, the Config signal may be provided from the storage controller 114, the host processor 106, another controller or processor connected to the storage device 104, and/or any other suitable controller, processor, and/or device connected to the storage device 104.

For example, in an embodiment, when the first logic gates 310 and 312 are AND logic gates, a selection signal (e.g., a high-level signal) of the Config signal may be provided to the selected one of the AND logic gates 310 and 312, and a deactivation signal (e.g., a low-level signal) of the Config signal may be provided to the other one (e.g., the non-selected one) of the AND logic gates 310 and 312. In this case, for example, the selected one of the AND logic gates 310 or 312 receiving the selection signal (e.g., the high-level signal) of the Config signal may output a high-level signal (e.g., 1) when it receives a high-level signal as the comparison result from the corresponding comparator 306 and 308 (e.g., indicating that the corresponding binary counter 302 and 304 has reached the threshold), and may output a low-level signal otherwise (e.g., when the comparison result has a low-level signal, indicating that the corresponding binary counter 302 and 304 has not reached the threshold).

The non-selected one of the AND logic gates 310 and 312 receiving the deactivation signal (e.g., the low-level signal) of the Config signal may output a low-level signal (e.g., 0) regardless of the comparison result from the corresponding comparator 306 and 308, because of the deactivation signal (e.g., the low-level signal).

In an embodiment, as shown in FIG. 3, the same Config signal may be provided to each of the first logic gates 310 and 312. For example, one of the first logic gates 310 and 312 may have an inverter (or a NOT gate) connected to an input thereof for inverting a level of the Config signal, and the other of the first logic gates 310 and 312 may receive the level of the Config signal as-is, such that the same Config signal may be provided to select one of the first logic gates 310 and 312. In this case, for example, when the Config signal has a low-level, the inverter may invert the low-level signal into the selection signal (e.g., the high-level signal) for the one of the first logic gates 310 and 312, and the other of the first logic gates 310 and 312 may receive the low-level of the Config signal as the deactivation signal (e.g., the low-level signal). Similarly, when the Config signal has a high-level, the inverter may invert the high-level signal into the deactivation signal (e.g., the low-level signal) for the one of the first logic gates 310 and 312, and the other of the first logic gates 310 and 312 may receive the high-level of the Config signal as the selection signal (e.g., the high-level signal). However, the present disclosure is not limited thereto, and in other embodiments, a different Config signal may be provided to each of the first logic gates 310 and 312 to select a desired or suitable one of the first logic gates 310 and 312.

In some embodiments, the outputs of the first logic gates (e.g., the AND logic gates) 310 and 312 may be provided to a second logic gate (e.g., an OR logic gate) 314, such that a trigger signal (TRIGGER) may be generated by the second logic gate 314. The trigger signal may be used (e.g., by the response generation circuit 206) to automatically transmit a response to the host device 102. For example, in an embodiment, when the second logic gate 314 is an OR logic gate, the OR logic gate 314 may provide the trigger signal as a high-level signal (e.g., 1) when any one of the first logic gates (e.g., the AND logic gates) 310 and 312 provides a high-level signal (e.g., indicating that the corresponding binary counter 302 and 304 has reached the threshold), and may output a low-level signal (e.g., 0) in other cases. Because the deactivated one of the first logic gates (e.g., the AND logic gates) 310 and 312 may provide a low-level signal (e.g., 0), and the selected one of the first logic gates (e.g., the AND logic gates) 310 and 312 may only provide a high-level signal (e.g., 1) when it receives a high-level signal as the comparison result from the corresponding comparator 306 and 308 (e.g., indicating that the corresponding binary counter 302 and 304 has reached the threshold), the OR logic gate 314 may provide the trigger signal having the high-level signal to trigger the automatic response only when the selected one from among the notification counter 208 and the acknowledgement counter 210 has reached the threshold value (e.g., 0).

Accordingly, in one or more embodiments, the response circuit 112 may be configured to provide an automatic response to the host device 102 according to a state of the counters 208 and 210, and a configuration (e.g., a mode) of the configurable command response trigger thereof. While FIG. 3 shows an example implementation of the configurable command response trigger of the response circuit 112, the present disclosure is not limited thereto, and the configurable command response trigger of the response circuit 112 may be variously modified according to the spirit and scope of the present disclosure. For example, the configurable command response trigger may include (e.g., may be implemented with) various suitable hardware structures, electronic elements, and/or components, for example, such as other various suitable logic gates (e.g., NAND gates, NOR gates, XOR gates, NOT gates, EXOR gates, EXNOR gates, and/or the like), various suitable switches, various suitable transistors, various suitable resistors, various suitable capacitors, various suitable registers, various suitable flip-flops, various different kinds of counters, various different kinds of comparators, and/or the like, as would be known to those skilled in the art when studying the content of the present disclosure, and/or learned from practicing one or more embodiments of the present disclosure.

Figure 4:
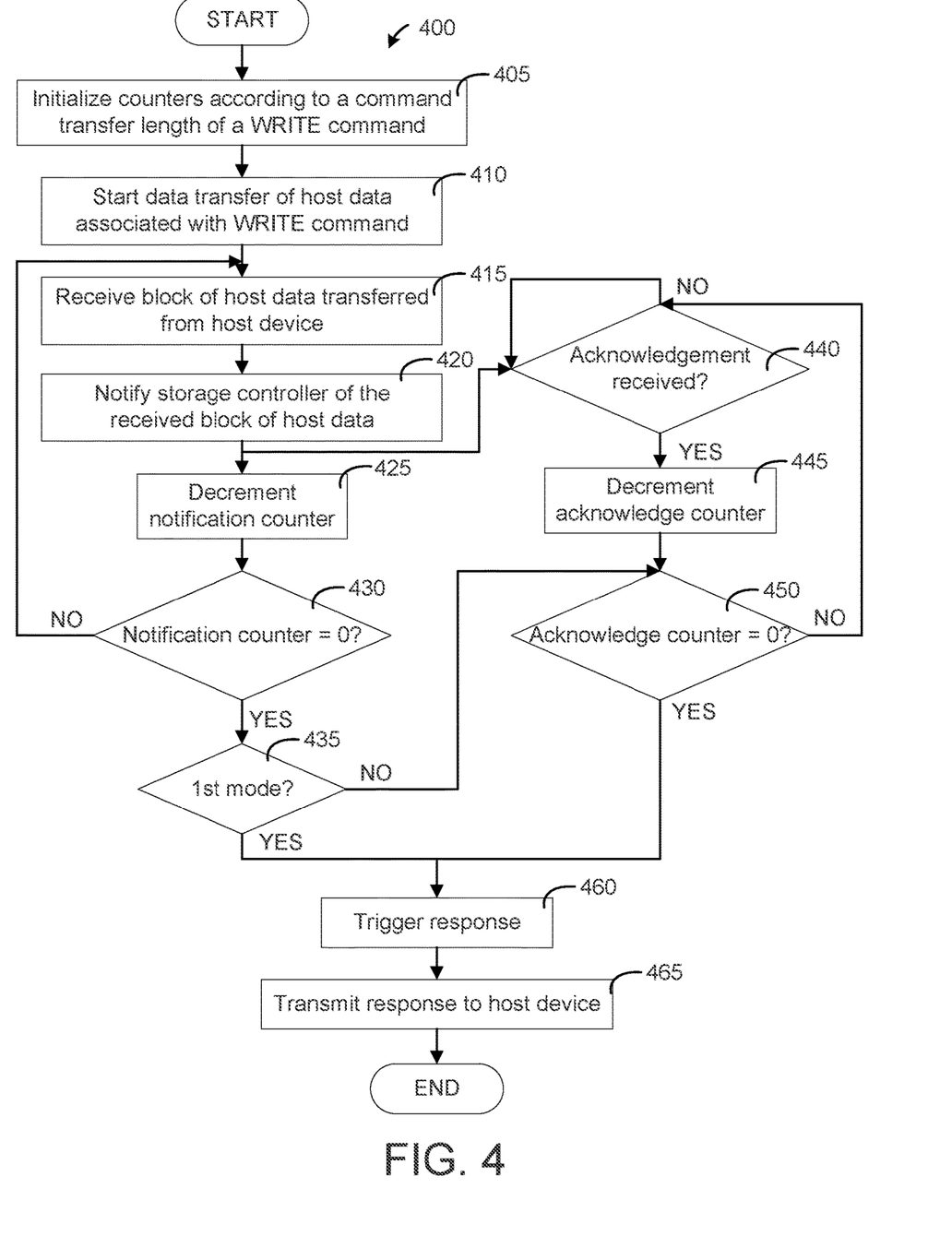
FIG. 4 is a flow diagram of a method of generating a response to a WRITE command, according to one or more example embodiments of the present disclosure.

FIG. 4 is a flow diagram of a method of generating a response to a WRITE command, according to one or more example embodiments of the present disclosure. However, the present disclosure is not limited to the sequence or number of the operations of the method 400 shown in FIG. 4, and can be altered into any desired sequence or number of operations as recognized by a person having ordinary skill in the art. For example, in some embodiments, the order may vary, or the method may include fewer or additional operations.

Referring to FIG. 4, the method 400 starts when a WRITE command is issued from the host device 102 such that the WRITE command is received by the storage device 104 over the storage interface 110. Counters are initialized according to a command transfer length of the WRITE command at operation 405. For example, the notification counter 208 and the acknowledgement counter 210 may be initialized to have an initial value according to the command transfer length of the WRITE command. A data transfer of host data associated with the WRITE command starts at operation 410. For example, the host device 102 may start to transfer host data associated with the WRITE command to the storage device 104 over the storage interface 110. A portion (e.g., a block) of the host data transferred from the host device 102 is received at operation 415. For example, the receive datapath circuit 202 may receive the block of host data from among the host data from the host device 102 over the storage interface 110.

The storage controller 114 (or another processor executing firmware and/or software) may be notified of the received block of host data at operation 420. For example, the receive datapath circuit 202 may transmit a notification to the storage controller 114 that the block of host data has been received. In this case, after operation 420, two loops may begin, a first loop starting with operation 425, and a second loop starting with operation 440. For convenience, the first loop starting with operation 425 will be described first, and then the second loop starting with operation 440 will be described next, but the present disclosure is not limited to the sequence or timing thereof. For example, the first loop starting with operation 425 may begin concurrently (e.g., simultaneously) with the second loop starting with operation 440, or the second loop starting with operation 440 may begin after one or more operations of the first loop starting with operation 425.

The notification counter 208 may be decremented at operation 425. For example, the notification counter 208 may be decremented in response to the transmission of the notification to the storage controller 114. In this case, a current value of the notification counter 208 may be compared with a threshold value (e.g., 0) to determine whether the notification counter 208 has reached the threshold (e.g., has been decremented to 0) at operation 430. For example, the comparator 306 of the configurable command response trigger of the response circuit 112 may compare the current value of the notification counter 208 with the threshold value (e.g., 0) to determine whether all of the host data has been received and notified. If the current value of the notification counter 208 has not reached the threshold (e.g., has not been decremented to 0) at operation 430 (e.g., NO), then the method 400 may loop back to operation 415, such that another portion (e.g., another block) of the host data is received at operation 415, and the method continues at operation 420, until all of the blocks of host data has been received (e.g., the notification counter 208 has been decremented to 0) at operation 430.

On the other hand, if the current value of the notification counter 208 has reached the threshold (e.g., has been decremented to 0) at operation 430 (e.g., YES), the response circuit 112 (e.g., the configurable command response trigger thereof) may determine whether the configurable command response trigger is configured to operate under a first mode at operation 435. For example, in an embodiment, the comparison result of the comparator 306 may be provided to the first logic gate (e.g., the AND logic gate) 310, and the first logic gate may perform an operation (e.g., an AND operation) between the comparison result and the Config signal. In this case, if the Config signal is provided as the selection signal (e.g., the high-level signal), then it may be determined that the first mode is configured (e.g., YES) at operation 435, such that the response is triggered at operation 460, and the response is transmitted to the host device 102 at operation 465 (e.g., by the response generator circuit 206). On the other hand, if the Config signal is provided as the deactivation signal (e.g., the low-level signal), then it may be determined that the first mode is not configured (e.g., NO) at operation 435. In this case, the response circuit 112 (e.g., the configurable command response trigger thereof) may determine that the configurable command response trigger is configured to operate under a second mode (e.g., based on the inverter) at operation 435, such that the response circuit 112 may wait until the acknowledgement counter 210 has reached the threshold (e.g., has been decremented to 0) at operation 450.

Referring back to operation 420, in response to the notification being transmitted to the storage controller 114 at operation 420, the storage controller 114 may process the notification, such that the storage controller 114 may transmit an acknowledgement to the response circuit 112 (e.g., the response trigger circuit 204) indicating that the notification has been processed. Accordingly, it may be determined whether an acknowledgement is received at operation 440. For example, the response trigger circuit 204 may determine whether an acknowledgement is received from the storage controller 114. If the acknowledgement has not been received at operation 440 (e.g., NO), the method 400 may loop back to operation 440 until an acknowledgment corresponding to the notification of operation 420 is received.

On the other hand, if an acknowledgment is received at operation 440 (e.g., YES), the acknowledgment counter 210 may be decremented at operation 445. In this case, a current value of the acknowledgment counter 210 may be compared with a threshold value (e.g., 0) to determine whether the acknowledgment counter 210 has reached the threshold (e.g., has been decremented to 0) at operation 450. For example, the comparator 308 of the configurable command response trigger of the response circuit 112 may compare the current value of the acknowledgment counter 210 with the threshold value (e.g., 0) to determine whether all of the notifications associated with the host data has been processed by the storage controller 114. If the current value of the acknowledgment counter 210 has not reached the threshold (e.g., has not been decremented to 0) at operation 450 (e.g., NO), then the method 400 may loop back to operation 440, such that the response trigger circuit 204 may determine whether another acknowledgement associated with another notification is received from the storage controller 114 at operation 440, until all of the acknowledgements associated with the host data has been received (e.g., the acknowledgment counter 210 has been decremented to 0) at operation 450.

On the other hand, if the current value of the acknowledgment counter 210 has reached the threshold (e.g., has been decremented to 0) at operation 450 (e.g., YES), the response may be triggered at operation 460. For example, in an embodiment, the comparison result of the comparator 308 may be provided to the first logic gate (e.g., the AND logic gate) 312, and the first logic gate may perform an operation (e.g., an AND operation) between the comparison result and the Config signal. In this case, because it was determined that configurable command response trigger is configured to operate under the second mode at operation 435 (e.g., NO), the Config signal is provided as the selection signal (e.g., the high-level signal) to the first logic gate 312 (e.g., based on the inverter), such that the response is triggered at operation 460, and the response is transmitted to the host device 102 at operation 465 (e.g., by the response generator circuit 206).

While one or more embodiments of the present disclosure have been described above such that the command response trigger includes two modes corresponding to two counters (e.g., the notification counter 208 and the acknowledgment counter 210), the present disclosure is not limited thereto, and the command response trigger may include more or less modes, and/or more or less counters. For example, in an embodiment, the command response trigger may include a third mode to trigger an automatic response, for example, when the host data is received but not yet notified. In this case, the response to the host device 102 may be provided even earlier than the other modes, but risk of data loss may be the greatest. For example, in this case, the command response trigger may include a third counter to track when all of the host data has been received but not yet notified, and when operating under this configuration (e.g., under this mode), the response may be automatically generated even before the storage controller 114 has been notified about all of the host data.

As described above, according to one or more example embodiments of the present disclosure, a storage device may include a hardware module (e.g., a response circuit) to track one or more states of host data being transferred to the storage device from a host device, rather than using firmware or software (e.g., a processor executing instructions, such as a storage controller) to maintain and process the state information of the host data. Accordingly, latency may be reduced and/or throughput of the storage device may be improved.

As described above, according to one or more example embodiments of the present disclosure, the hardware module (e.g., the response circuit) may include a configurable command response trigger to provide a suitable response to the host device according to various different states of the host data being transferred to the storage device 104 and a configuration (or a mode) of the command response trigger. Accordingly, the command response trigger may be dynamically configured at start-time, runtime, on a per-command basis, and/or the like, in consideration of the various characteristics of the storage device and/or the host data, and according to a balance between performance and reliability of the storage device.

In the drawings, the relative sizes of elements, layers, and regions may be exaggerated and/or simplified for clarity. It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Although some example embodiments have been described, those skilled in the art will readily appreciate that various modifications are possible in the example embodiments without departing from the spirit and scope of the present disclosure. It will be understood that descriptions of features or aspects within each embodiment should typically be considered as available for other similar features or aspects in other embodiments, unless otherwise described. Therefore, it is to be understood that the foregoing is illustrative of various example embodiments and is not to be construed as limited to the specific example embodiments disclosed herein, and that various modifications to the disclosed example embodiments, as well as other example embodiments, are intended to be included within the spirit and scope of the present disclosure as defined in the appended claims, and their equivalents.

What is claimed is:

1. A storage device comprising:
   a storage controller configured to:
      receive a first notification corresponding to a first portion of host data transferred from a host device to the storage device over a storage interface based on a particular host command; and
      receive a second notification corresponding to a second portion of the host data transferred from the host device to the storage device over the storage interface based on the particular host command;
   storage memory; and
   a response circuit connected to the storage controller, the response circuit configured to:
      track the first notification corresponding to the first portion of the host data and the second notification corresponding to the second portion of the host data;
      track a first acknowledgment and a second acknowledgment received from the storage controller, the first acknowledgment corresponding to the first notification and the second acknowledgment corresponding to the second notification; and
      transmit a response to the host device according to a state of the first and second notifications, or the first and second acknowledgements.

2. The storage device of claim 1, wherein the response circuit comprises at least one counter to track the first and second notifications and the first and second acknowledgements, and the state corresponds to a count value of the at least one counter.

3. The storage device of claim 2, wherein the count value is initialized based on a command transfer length associated with the host data.

4. The storage device of claim 3, wherein the at least one counter comprises a first counter to track the first and second notifications, and the count value of the first counter is decremented for each notification from among the first and second notifications that is transmitted to the storage controller.

5. The storage device of claim 4, wherein the response circuit comprises a comparator, and the comparator is configured to compare the count value with a threshold value.

6. The storage device of claim 5, wherein the response circuit is configured to determine that the host data has been received and notified in response to the count value being equal to the threshold value.

7. The storage device of claim 3, wherein the at least one counter comprises a second counter to track the first and second acknowledgements, and the count value of the second counter is decremented for each acknowledgement from among the first and second acknowledgements that is received from the storage controller.

8. The storage device of claim 7, wherein the storage controller is configured to transmit an acknowledgment from among the first and second acknowledgments in response to processing a corresponding notification.

9. The storage device of claim 8, wherein:
the response circuit comprises a comparator, and the comparator is configured to compare the count value with a threshold value; and
the response circuit is configured to determine that the host data has been processed by the storage device in response to the count value being equal to the threshold value.

10. The storage device of claim 8, wherein the storage controller is configured to persistently store the host data in the storage memory based at least in part on the first and second notifications.

11. A method of triggering a response to a particular command issued by a host device to a storage device, the method comprising:
receiving, by a storage controller, a first notification corresponding to a first portion of host data transferred over a storage interface from the host device to the storage device, the host data being based on the particular command;
receiving, by the storage controller, a second notification corresponding to a second portion of the host data transferred from the host device to the storage device over the storage interface based on the particular command;
triggering, by a response circuit connected to the storage controller, a response to the host device, wherein the triggering comprises:
tracking, by the response circuit, the first and second notifications, the first notification corresponding to the first portion of the host data and the second notification corresponding to the second portion of the host data;
receiving, by the response circuit, first and second acknowledgments from the storage controller, the first acknowledgment corresponding to the first notification and the second acknowledgment corresponding to the second notification;
tracking, by the response circuit, the first and second acknowledgments; and
determining, by the response circuit, a state of the first and second notifications, or the first and second acknowledgements; and
transmitting, by the response circuit, the response to the host device according to the state.

12. The method of claim 11, wherein the state corresponds to a count value of at least one counter of the response circuit to track the first and second notifications and the first and second acknowledgments.

13. The method of claim 12, further comprising:
initiating, by the response circuit, the count value based on a command transfer length associated with the host data.

14. The method of claim 13, wherein the at least one counter comprises a first counter to track the first and second notifications, and the method further comprises:
decrementing, by the response circuit, the count value of the first counter for each notification from among the first and second notifications that is transmitted to the storage controller.

15. The method of claim 14, wherein the response circuit comprises a comparator, and the method further comprises:
comparing, by the comparator, the count value with a threshold value.

16. The method of claim 15, further comprising:
determining, by the response circuit, that the host data has been received and notified in response to the count value being equal to the threshold value.

17. The method of claim 13, wherein the at least one counter comprises a second counter to track the first and second acknowledgements, and the method further comprises:
decrementing, by the response circuit, the count value of the second counter for each acknowledgement from among the first and second acknowledgements that is received from the storage controller.

18. The method of claim 17, further comprising:
processing, by the storage controller, a corresponding notification from among the first and second notifications; and
transmitting, by the storage controller, an acknowledgment from among the first and second acknowledgements in response to the processing of the corresponding notification.

19. The method of claim 18, wherein the response circuit comprises a comparator, and the method further comprises:
comparing, by the comparator, the count value with a threshold value; and
determining, by the response circuit, that the host data has been processed by the storage device in response to the count value being equal to the threshold value.

20. The method of claim 18, further comprising:
persistently storing, by the storage controller, the host data in storage memory based at least in part on the first and second notifications.

* * * * *